US007122067B2

(12) United States Patent
Prellwitz et al.

(10) Patent No.: US 7,122,067 B2
(45) Date of Patent: Oct. 17, 2006

(54) INTAKE AIR FILTER FOR AN INTERNAL COMBUSTION ENGINE

(75) Inventors: Christian Prellwitz, Lorch (DE); Jürgen Stehlig, Neckartailfingen (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 140 days.

(21) Appl. No.: 10/497,330

(22) PCT Filed: Nov. 26, 2002

(86) PCT No.: PCT/DE02/04336

§ 371 (c)(1),
(2), (4) Date: Jun. 1, 2004

(87) PCT Pub. No.: WO03/048557

PCT Pub. Date: Jun. 12, 2003

(65) Prior Publication Data

US 2005/0061292 A1 Mar. 24, 2005

(30) Foreign Application Priority Data

Dec. 1, 2001 (DE) ............................... 101 59 097

(51) Int. Cl.
*B01D 46/00* (2006.01)
(52) U.S. Cl. .................. 55/385.3; 55/484; 55/417; 55/498; 55/502; 55/DIG. 28; 55/DIG. 30; 123/198 E; 60/282; 60/304; 180/313

(58) Field of Classification Search ............... 55/385.3, 55/484, 417, DIG. 28, DIG. 30, 502, 498; 123/198 E; 60/282, 304; 180/313
See application file for complete search history.

(56) References Cited

U.S. PATENT DOCUMENTS 3,906,724 A 9/1975 Yoshizaki (Continued)

FOREIGN PATENT DOCUMENTS

DE 1925 579 9/1970

(Continued)

*Primary Examiner*—Duane Smith
*Assistant Examiner*—Minh-Chau T. Pham
(74) *Attorney, Agent, or Firm*—Collard & Roe, P.C.

(57) ABSTRACT

An intake air filter (1) is for an internal combustion engine, especially in a motor vehicle. The filter has a filter housing (2) having a raw air inlet (4), a pure air outlet (5), and an annular filter element (3) which is arranged in the filter housing (2) and through which air can flow in a radial manner from the outside towards the inside. The filter element has a first end disk (10) on the axial end thereof, said disk has an opening (12) by which means the pure air outlet (5) communicates with the inside (8) of the annular filter element (3). The purpose is to reduce the influence of a secondary air induction on the fresh air supply of the internal combustion engine. To this end, the filter housing (2) has a secondary air outlet (6), on the pure air side, and the annular filter element (3) has a second end disk (11) on an axial end opposing the first end disk (10). The second end disk has at least one opening (17) by which the secondary air outlet (6) communicates with the inside (8) of the annular filter element (3).

12 Claims, 1 Drawing Sheet

U.S. PATENT DOCUMENTS

| | | |
|---|---|---|
| 4,179,883 A | 12/1979 | Nishiyama et al. |
| 4,974,986 A * | 12/1990 | Cook .......................... 403/218 |
| 5,167,683 A * | 12/1992 | Behrendt et al. ............. 55/478 |
| 5,171,342 A * | 12/1992 | Trefz .......................... 55/487 |
| 5,413,712 A * | 5/1995 | Gewiss et al. .............. 210/450 |
| 6,306,190 B1 | 10/2001 | Tsuruta et al. |
| 6,540,806 B1 * | 4/2003 | Reinhold ..................... 55/490 |
| 6,881,237 B1 * | 4/2005 | Storz et al. ................ 55/385.3 |
| 2001/0005984 A1 * | 7/2001 | Knodler et al. ............ 55/385.3 |
| 2004/0011011 A1 * | 1/2004 | Storz et al. ................ 55/385.3 |
| 2005/0247034 A1 * | 11/2005 | Canova et al. ............. 55/385.3 |

FOREIGN PATENT DOCUMENTS

| | | |
|---|---|---|
| DE | 24 29 474 | 11/1975 |
| DE | 36 08 670 | 9/1986 |
| DE | 35 02 698 | 1/1987 |
| DE | 39 34 433 | 4/1991 |
| DE | 195 21 898 | 12/1996 |
| DE | 196 41 467 | 4/1998 |
| DE | 196 53 336 | 6/1998 |
| GB | 1 220 174 | 1/1971 |
| JP | 55 046009 | 3/1980 |

* cited by examiner

INTAKE AIR FILTER FOR AN INTERNAL COMBUSTION ENGINE

CROSS REFERENCE TO RELATED APPLICATIONS

Applicant claims priority under 35 U.S.C. §119 of German Application No. 101 59 097.0 filed Dec. 1, 2001. Applicant also claims priority under 35 U.S.C. §365 of PCT/DE02/04336 filed Nov. 26, 2002. The international application under PCT article 21(2) was not published in English.

BACKGROUND OF THE INVENTION

1. Field of the Invention

The present invention relates to an intake air filter for an internal combustion engine, in particular in a motor vehicle.

2. The Prior Art

Such an intake air filter is known, for example, from German Patent DE 39 34 433 C2 and has filter housing which has a crude air inlet and a clean air outlet. In this filter housing, the intake air filter contains a ring filter insert through which the air flows radially from the outside to the inside during operation and which has a first end disk cap on one axial end. This first end disk is designed as an opened end disk and thus has a central opening through which an outlet connection formed on the clean air outlet of the filter housing passes through the first end disk so that the clear air outlet communicates with the interior of the ring filter insert on the clean side through the opening in the first end disk. A second end disk of the ring filter insert designed on one axial end facing away from the first end disk is designed as a closed end disk.

Such an intake air filter is used to supply an internal combustion engine with purified fresh air and forms a part of an intake tract of the internal combustion engine. With certain internal combustion engines, air may be injected into the exhaust line of the internal combustion engine with the help of a secondary air supply, for example in order to perform a secondary oxidation of the combustion exhaust gases in the exhaust line in order to reduce emissions. Purified fresh air which branches off from the intake tract of the internal combustion engine downstream from the intake air filter is normally used for this purpose. Likewise, fresh air purified with the help of a secondary air supply may also be needed for other purposes, e.g., regeneration of a particle filter. Since the intake tract of an internal combustion engine, e.g., in a motor vehicle, is usually also designed to attenuate the sound that occurs during operation, an additional branch line connected to the fresh air line may have a negative effect on noise optimized tuning of the intake system. Furthermore, activation of a secondary air fan causes a drop in pressure in the fresh air tract which may have a negative effect on fresh air supply to the internal combustion engine.

SUMMARY OF THE INVENTION

The present invention has as an object providing a means of reducing the influence of the diverting the secondary air on the tuning of the fresh air system for an internal combustion engine having a secondary air supply.

This object is achieved according to the present invention.

This invention is based on the general idea of diverting the secondary air as early as at the filter housing by mounting a secondary air outlet there which communicates in the interior of the filter housing with the interior of the ring filter insert through a second end disk of the ring filter insert which is opposite the first end disk. Due to this design, the secondary air is removed on the clean side of the ring filter insert, but the additional removal of air does not take place downstream from the filter housing but instead occurs already in the filter housing. A pressure drop which may optionally occur in activation of the secondary air intake- may then have little or no effect on the intake tract of the internal combustion engine downstream from the filter housing, first because the flow path to the crude air inlet of the filter housing with the design according to this invention is relatively short and second, the crude air inlet of the filter housing may be designed to be large accordingly so that there is no throttling at this point which would encourage a pressure drop. In addition, the design of the intake air filter according to this invention permits a novel form of guidance for the intake line of the secondary air supply which may be advantageous for certain applications.

According to an advantageous embodiment, a connection may be provided on the second end disk so that the secondary air outlet of the filter housing communicates with the interior of the ring filter insert through this connection. This design makes it possible to greatly simplify the installation of the ring filter insert equipped with this connection in the filter housing. At the same time this yields a simple design of the filter housing.

Essentially it is possible to manufacture the connection and the second end disk as separate components, in which case the connection is then inserted into the second end disk and/or is fixedly connected to it and/or is welded or glued to it. This design permits a choice of materials that is optimized as to function for the components that are produced independently of one another.

As an alternative, the connection may be manufactured separately from the second end disk, in which case then the connection is fixedly molded or foamed into the second end disk by injection molding or foaming at the time of manufacture of the second end disk. This design also permits a differentiated choice of materials for the two components, whereby the connection is integrated into the second end disk in its manufacture in order to thereby form an inseparable unit. This type of manufacturing eliminates assembly of the connection on the end disk and also eliminates the need for sealing measures.

In a particularly advantageous alternative embodiment, the connection may be integrally molded onto the second end disk. This means that the connection and the second end disk are manufactured as a single part, in particular in one injection molding operation. This design can be implemented in a particularly inexpensive manner is advantageously suitable for mass production.

According to a special refinement, a secondary outlet connection may be formed on the filter housing, this outlet connection being designed to be complementary to the connection of the second end disk and communicating with the interior of the ring filter insert through the secondary air outlet. The secondary air outlet connection forms an extension of the secondary air outlet in the interior of the filter housing. With the help of such a secondary outlet connection, a sufficiently well-sealed communicating connection between the secondary air outlet and the interior of the ring filter insert can be implemented in a particularly simple manner. Furthermore, through a suitable arrangement of such a secondary outlet connection, installation of the ring filter insert in the filter housing can be simplified, which is advantageous in initial assembly as well as when replacing the ring filter insert.

Here again, it is expedient to design the secondary outlet connection as an integral part of the filter housing, so that a relatively inexpensive one-piece production becomes possible, e.g., by an injection molding process.

Installation of the ring filter insert into the filter housing may also be simplified by the fact that the secondary outlet connection of the filter housing and the connection of the second end disk cooperate in the manner of a plug connection when the ring filter insert is inserted into the filter housing.

Other important features and advantages of this invention are derived from the subclaims, the drawings and the respective description of the figures on the basis of the drawings.

It is self-evident that the features mentioned above as well as those to be described below can be used not only in the combination indicated but also in other combinations or alone without going beyond the scope of the present invention.

BRIEF DESCRIPTION OF THE DRAWINGS

A preferred exemplary embodiment of this invention is depicted in the drawings and is explained in greater detail in the following description, where the same reference notation refers to the same or functionally identical or similar components.

The only FIGURE is FIG. 1, which shows a sectional view through an intake air filter according to this invention.

DETAILED DESCRIPTION OF PREFERRED EMBODIMENTS

Figure 1:
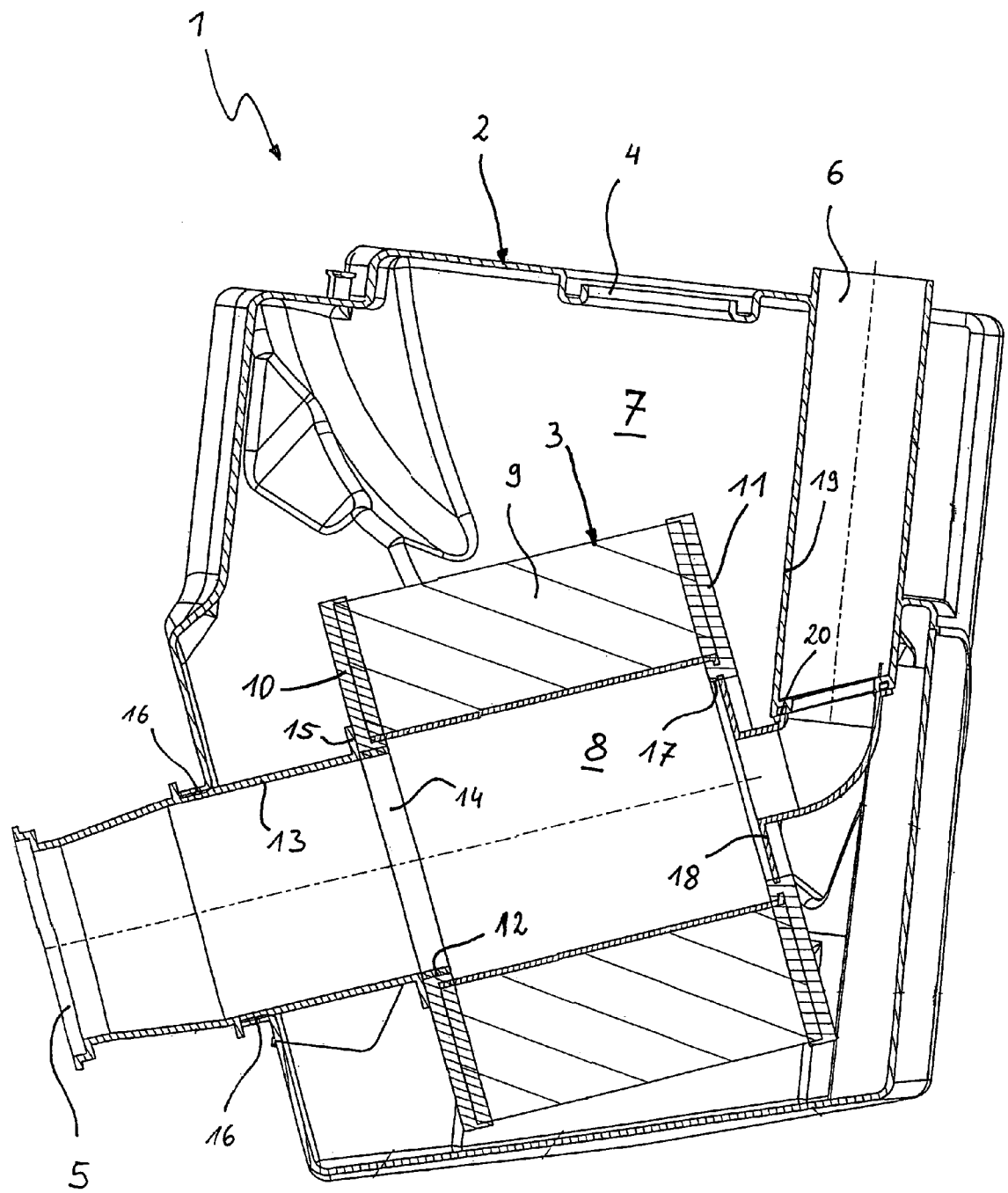

According to FIG.1, an inventive intake air filter 1 has a filter housing 2 and a ring filter insert 3 accommodated therein. The intake air filter 1 forms a component of a fresh air tract (not otherwise shown) of an internal combustion engine (also not shown), in particular in a motor vehicle. The filter housing 2 has a crude air inlet 4 which usually communicates with the ambient air of the internal combustion engine. In addition, the filter housing 2 contains a clean air outlet 5 through which the filtered fresh air goes to the combustion chambers of the internal combustion engine. The inventive filter housing 2 is also equipped with a secondary air outlet 6 which can be connected to a secondary air supply (as not shown) of the internal combustion engine.

The ring filter insert 3 separates a crude space 7 which surrounds the ring filter insert 3 from a clean space 8 formed by the interior of the ring filter insert 3 in the interior of the filter housing so that when the reference number 8 is used below it is understood to also refer to the interior of the ring filter insert 3. In this design, a ring-shaped filter body 9 of the ring filter insert 3 has air flowing through it radially from the outside to the inside. The ring filter insert 3 has an end disk on each of its axial ends, namely a first end disk 10 and a second end disk 11.

The first end disk 10 is assigned to the clean air outlet 5 and contains a central opening 12 through which the clean air outlet 5 communicates with the interior 8 of the ring filter insert 3. In the embodiment shown here, a main outlet connection 13 is formed on the filter housing 2 in the area of the clean air outlet 5, so that the ring filter insert 3 can be placed on it with the opening 12 of the first end disk 10. In doing so, an axially protruding ring 14 then penetrates into the opening 12 in the first end disk 10. When the ring filter insert 3 is completely placed in position, the first end disk 10 is in contact in the insertion direction with a peripheral collar 15 protruding radially, the collar being formed on the main outlet connection 13 and being closed in the peripheral direction. Corresponding sealing means (not shown here) ensure adequate sealing of the clean side 8 with respect to the crude side 7. The main outlet connection 13 can be manufactured separately from the filter housing 2 and connected at 13, in particular by a weld or a glued connection.

Like the first end disk 10, the second end disk 11 is also designed as an open end disk and includes a central opening 17 through which the secondary air outlet 6 communicates with the interior 8 of the ring filter insert 3. In the area of this central opening 17, a connection 18 is inserted into the second end disk 11. For example this connection 18 may be designed by injection and/or foaming around a core and/or in one piece with the end disk material in the manufacture of the second end disk 11 in a suitable manner, so that the connection 18 forms a permanent part of the second end disk 11. In the embodiment shown here, in the case of a ring filter insert 3 inserted into the filter housing 2, the connection 18 is bent at an angle and/or curved and connected so that it communicates with a secondary air outlet connection 19. This secondary outlet connection 19 is designed on the inside of the filter housing 2 and is connected to the secondary air outlet 6 so that they communicate and/or the secondary outlet connection 19 forms the secondary air outlet 6 on its end which faces away from the connection 18. The secondary outlet connection 19 is expediently manufactured in one piece, i.e., integrally with the filter housing 2, e.g., by an injection molding process.

In the embodiment shown here, the connection 18 and the secondary outlet connection 19 come to rest on one another in the axial direction in the case of the ring filter insert 3 inserted into the filter housing 2, with sealing agents 20 that act axially being provided to also seal the clean space 8 with respect to the crude space 7 in the area of the second end disk 11.

An embodiment in which the connection 18 and the secondary outlet connection 19 cooperate in the manner of a plug connection is preferred, in which case a radial gasket may be then be provided in particular.

It is likewise possible to design one of the connections 18 or 19 with a conical shape, in which case then the other connection will have a complementary receptacle. This design also simplifies the manufacture of a tight coupling between the two connections 18 and 19.

In another embodiment, one of the connections, e.g., the secondary outlet connection 19, may be equipped with a displaceable sleeve which is displaceable in the axial direction on the outer jacket of the secondary outlet connection 19. When the sleeve is pushed back, it is adjusted in the direction of the secondary air outlet 6 to thereby facilitate the installation and removal of the ring filter insert 3. When the ring filter insert 3 is inserted, then an end of the connection 18 which faces the secondary outlet connection 19 comes to rest axially on the facing end of the secondary outlet connection 19, in which case then the sleeve can be pushed over the mutually abutting axial ends of the connections 18 and 19 to thereby ensure a sufficiently tight coupling between the two connections 18 and 19.

During operation of the internal combustion engine, unfiltered fresh air flows through the crude air inlet 4 into the filter housing 2, going from there into the interior 8 of the ring filter insert 3 and coming out of the filter housing 2 through the clean air outlet 5. This fresh air flow is generated by a vacuum created by the internal combustion engine and applied to the clean air outlet 5. When the secondary air supply is deactivated, a secondary air line (not shown) which is connected to the secondary air outlet 6 is block accordingly. If the internal combustion engine or its exhaust gas purification system requires secondary air, a corresponding secondary air fan (not shown here) is activated, applying a suitable vacuum to the secondary air outlet 6 to thereby draw purified fresh air out of the interior 8 of the ring filter insert 3. Since the flow path up to the crude air inlet 4 is relatively short in the inventive intake air filter 1, this additional fresh air demand leads to relatively little or no pressure drop in the intake tract leading from the filter housing 2 to the internal combustion engine. In addition, the secondary air has very little or no negative effect on the sound-absorbing measures in the intake tract between the internal combustion engine and the filter housing 2. Accordingly the inventive intake air filter 1 may also be used in principle with such an intake system which was originally not designed for a secondary air supply. To this extent the inventive intake air filter 1 permits a modular add-on design for the intake system.

The invention claimed is:

1. An intake air filter for an internal combustion engine, in particular in a motor vehicle,
comprising a filter housing (2) which has a crude air inlet (4) and a clean air outlet (5) and
comprising a ring filter insert (3) which is situated in the filter housing (2) and through which the air flows radially from the outside to the inside, having a first end disk (10) on one axial end, said disk having at least one opening (12) through which the clean air outlet (5) communicates with the interior (8) of the ring filter insert (3),
whereby the filter housing (2) has a secondary air outlet (6) on the clean side and
whereby the ring filter insert (3) has a second end disk (11) on one axial end which faces away from the first end disk (10), said second end disk having at least one opening (17),
wherein
the secondary air outlet (6) communicates through the opening (17) in the second end disk (11) with the interior (8) of the ring filter insert (3).

2. The intake air filter according to claim 1,
wherein
the connection (18) and the second end disk (11) are manufactured as separate parts, and the connection (18) is inserted into the second end disk (11) and/or is fixedly connected to the second end disk (11) and/or is welded or glued to the second end disk (11).

3. The intake air filter according to claim 1,
wherein
the connection (18) is manufactured separately from the second end disk (11), and the connection (18) is fixedly molded or embedded in foam in the second end disk (11) by injection molding or foaming around a core in the manufacture of the second end disk (11).

4. The intake air filter according to claim 1,
wherein
the intake connection (18) is integrally molded on the second end disk (11).

5. The intake air filter according to claim 1,
wherein
a secondary outlet connection (19) is formed on the filter housing (2) and is designed to be complementary to the connection (18), and the secondary air outlet (6) communicates with the interior (8) of the ring filter insert (3) through said connection.

6. The intake air filter according to claim 5,
wherein
the secondary outlet connection (19) is integrally molded on the filter housing (2).

7. The intake air filter according to claim 5,
wherein
the secondary outlet connection (19) and the connection (18) cooperate in the manner of a plug connection when the ring filter insert (3) is inserted into the filter housing (2).

8. The intake air filter according to claim 1,
wherein
a main outlet connection (13) is formed on the filter housing (2), with the ring filter insert (3) with the opening (12) in the first end disk (10) being attachable to this outlet connection, and the clean air outlet (5) communicates with the interior (8) of the ring filter insert (3) through this connection.

9. A ring filter insert for the intake air filter (1) according to claim 1, having on one axial end a first end disk (10) which has at least one opening (12) and having a second end disk (11) on the axial end opposite the first end disk (10),
wherein
the second end disk (11) has a connection (18) which communicates with the interior (8) of the ring filter insert (3) on the one hand and on the other hand also communicates with a secondary air outlet (6) of the filter housing (2) in the case of a ring filter insert (3) inserted into a filter housing (2) of the intake air filter (1).

10. A ring filter insert for the intake air filter (1) according to claim 1, having on one axial end a first end disk (10) which has at least one opening (12) and having a second end disk (11) on the axial end opposite the first end disk (10),
wherein
the second end disk (11) has a connection (18 which communicates with the interior (8) of the ring filter insert (3) on the one hand and on the other hand also communicates with a secondary air outlet (6) of the filter housing (2) in the case of a ring filter insert (3) inserted into a filter housing (2) of the intake air filter (1),
characterized by
the connection (18) and the second end disk (11) are manufactured as separate parts, and the connection (18) is inserted into the second end disk (11) and/or is fixedly connected to the second end disk (11) and/or is welded or glued to the second end disk (11).

11. A filter housing of the intake air filter (1) according to claim 1, having a crude air inlet (4), a clean air outlet (5) and a secondary air outlet (6) on the clean side,
wherein
a secondary outlet connection (19) is formed on the filter housing (2), communicating with the secondary air outlet (6) and being designed to be complementary to the connection (18), whereby the secondary air outlet (6) communicates through the secondary outlet connection (19) with the interior (8) of the ring filter insert (3) when the ring filter insert (3) is inserted into the filter housing (2).

12. A filter housing of the intake air filter (1) according to claim 1, having a crude air inlet (4), a clean air outlet (5) and a secondary air outlet (6) on the clean side,
wherein
a secondary outlet connection (19) is formed on the filter housing (2), communicating with the secondary air outlet (6) and being designed to be complementary to the connection (18), whereby the secondary air outlet (6) communicates through the secondary outlet connection (19) with the interior (8) of the ring filter insert (3) when the ring filter insert (3) is inserted into the filter housing (2),
characterized by
the secondary outlet connection (19) is integrally molded on the filter housing (2).

* * * * *